United States Patent Office 3,266,888
Patented August 16, 1966

3,266,888
PROCESS FOR ABSORBING SOLUBILIZED SILICA FROM ACIDIC AQUEOUS MEDIA WITH AN ORGANIC COMPOUND CONTAINING A POLY(ALKYLENE OXIDE) STRUCTURE
Mayer B. Goren, Golden, Colo., assignor to Kerr-McGee Oil Industries, Inc., a corporation of Delaware
No Drawing. Filed July 19, 1963, Ser. No. 296,381
23 Claims. (Cl. 75—97)

This invention broadly relates to the treatment of aqueous media containing solubilized silica to reduce the silica content. In some of its more specific variants, the invention further relates to improved hydrometallurgical processes for the recovery of metal values from acidic aqueous media containing solubilized silica.

A variety of processes deal with aqueous media containing colloidally dispersed or molecularly dissolved silica. Such solutions are frequently encountered in hydrometallurgical operations wherein metal ores undergo a treating step involving contacting the ore with an acidic aqueous leaching solution for the purpose of solubilizing desired metal values. Examples of processes producing silica-containing solutions include the acid leaching of copper, vanadium, nickel and zinc ores, among others. During the course of the acidic leaching step, which may be mild or quite vigorous, the siliceous constituents of the gangue may be attacked and part of the silica content of the ore effectively solubilized along with the desired metal values either as a substantially molecular silicic acid or as a polymer thereof of colloidal to sub-colloidal dimensions. In still other hydrometallurgical operations, impure concentrates of metals may be contaminated with "solubilized" or colloidal silica, and acid dissolution of the concentrates for further processing may give solutions contaminated with silica. In both types of processes, the silica may present difficulties in subsequent processing steps. Neutralization of the solutions of hydrolytically precipitate the metal values invariably yields a product at least partially contaminated by silica. If the liquors are to be processed for recovery of desired metal values by ion exchange techniques, the silica may undergo precipitation within the resin pores of either anion or cation resins and thereby interfere mechanically with the smooth operation of the process. The ion exchange resin may be of the types known in the art as strong base, weak base or intermediate base ion exchange resins.

Of even greater concern is the interference of the solubilized silica with liquid-liquid solvent extraction processes of the type which are currently of great importance in hydrometallurgical technology. In solvent extraction processes, the aqueous solution of metal values is usually intimately contacted in suitable prior art mixing devices with an immiscible organic liquid having solvent power for the desired metal values or with an organic solution of such a material, and the metal values are extracted from the aqueous phase into the organic phase. The immiscible liquids are then allowed to separate before they continue through the process. The presence of materials having surface-active properties hinders the complete, rapid separation of the aqueous and organic phases, and where essentially complete separation is not achieved, entrained aqueous phase will contaminate the organic phase, or vice versa. The reasons for avoiding such entrainment are obvious and well known to those skilled in the art, as is the knowledge the rapid and complete separation of the two phases is generally considered to be essential.

Among surface-active materials which promote phase disengagement difficulties is silica, such as the solubilized silica in acid leach liquors discussed above. The form in which the solubilized silica is present in the aqueous solution undoubtedly has a bearing on its effectiveness in promoting emulsification, and it is believed by those skilled in the art that it is probably not simply silicic acid [$Si(OH)_4$] that is deleterious, but more likely a condensed or polymerized form of either sub-colloidal or colloidal dimensions. It may be demonstrated that the introduction of carefully prepared silicic acid in which little or no polymer exists has substantially no effect on the phase separation behavior of an organic solvent-aqueous leach liquor system. However, more condensed silicic acids, such as those characterized by an ability to coagulate a "solution" of egg albumen or of other materials described herein do have marked deleterious effects on the ease of separation of a variety of solvent-leach liquor systems. Examples of these organic solvents include the water-insoluble alkyl and dialkyl phosphates, high molecular weight primary, secondary and tertiary amines, mixtures of these reagents which may be dissolved in kerosene as a diluent vehicle, as well as simple inert hydrocarbon systems such as kerosene, hexane, etc.

Relatively small amounts of condensed silicic acid markedly hinder phase separation after intermixing the two liquids, and also usually tend to stabilize the mixing system in such a fashion that the aqueous phase is continuous rather than the organic phase. In instances where it is desired that the organic phase be continuous due to any of a number of benefits obtained thereby, the stabilization of the aqueous phase as the continuous may markedly interfere with the smooth and efficient operation of the solvent extraction process. Accordingly, it is readily apparent that the presence of solubilized silica in leach liquors frequently introduces costly operating difficulties into hydrometallurgical processes, and that the elimination of such silica from the leach solutions would be of great commercial importance. However, prior to my inventions there has been no entirely satisfactory process for effectively reducing the colloidally dispersed or molecularly dissolved silica of the type discussed above even though the need for such a process has long existed It is an object of the present invention to provide a novel process for reducing the solubilized silica content of aqueous media.

It is a further object of the invention to provide an inexpensive and practical process for the treatment of acidic aqueous solutions containing dissolved or colloidally dispersed silicic acids which are precipitable by certain precipitants.

It is still a further object of the invention to provide improved hydrometallurgical processes for the recovery of metal values from aqueous media containing solubilized silica which include first reducing the silica content by the process of the invention.

Still other objects and advantages of the present invention will be apparent to those skilled in the art upon reference to the following detailed description and the examples.

In accordance with my earlier inventions, I have discovered a selective precipitation phenomenon for solubilized silica which is exhibited by water soluble organic materials containing a poly(alkylene oxide) structure and, preferably, a poly(ethylene oxide) structure. High molecular weight water soluble polyalkylene glycols and especially polyethylene glycols having a molecuar weight from about 5000 to several million are very useful in binding and precipitating colloidal and subcolloidal silica from aqueous acidic media. Lower molecular weight organic materials such as the water soluble polyethoxylated phenols and polyethoxylated long chain amides and amines also are of utility in such applications and serve as convenient and readily accessible reagents with which to test for the presence of solubilized silica in aqueous acidic media containing partly condensed silicas which promote the processing difficulties mentioned herein.

An acid leach liquor which contains dissolved partly condensed silica will give a precipitate ranging in nature from feathery floccules to an agglomerated rubbery material depending upon the molecular weight of the precipitate when treated with the foregoing reagents. If the liquors are treated with sufficient reagent and preferably the very high molecular weight poly(ethylene oxides) such as Polyox, which is said to be a high molecular weight poly(ethylene oxide), the resulting liquor from which the rubbery silica-organic complex has been separated will no longer give a precipitate on further addition of these reagents and will behave normally in solvent extraction and ion exchange processes with substantially no interference from silica. Analysis shows that the so-treated liquors still contain some silica, and it is believed that the residual silica remaining in solution which is not precipitated by the reagent and which causes no emulsion difficulties in solvent extraction processes is either unimolecular silicic acid or a low molecular weight condensed polymer thereof.

Fresh, carefully prepared solutions of silicic acid having a very low degree of condensation may be added to silica-free leach solutions of the type described above to give doped leach liquors of high silica content which are free of emulsification problems and which will give no precipitation with polyoxyethylated organic reagents. On the other hand, doping of such solutions with silica solutions prepared in a manner such that soluble but condensed silicic acid is formed will give doped liquors with all the limitations to processing discussed hereinabove and which afford precipitates with these selective reagents.

For convenience, Triton X–100, a proprietary product of Rohm & Haas Company which is a polyoxyethylated phenol, has been employed for the qualitative detection of solubilized condensed silica by a test procedure wherein one or two drops of the commercial material is added to several milliliters of the acidic solution to be tested. I refer to this test as being the "Triton Test." Other materials of related structure such as the "Carbowax" products and "Ucon" lubricants marketed by Union Carbide Corporation and the water dispersible "Etho" series of compounds, "Ethomids," "Ethomeens," etc., marketed by Armour & Company, all of which have polyoxyethylene structures, serve equally well in this qualitative test and form feathery flocculent precipitates which are indicative of the presence of condensed but soluble polysilicic acids. Egg albumen also may be used.

In accordance with my earlier inventions, I have found that an aqueous acidic solution containing polycondensed silica, the presence of which may be ascertained through the Triton test or through the use of egg albumen as a precipitant, may be reduced in polycondensed silica content by treatment with any of the hereinabove mentioned reagents, but preferably with ethylene oxide polymers. Preferably, the poly(ethylene oxide) polymers having a molecular weight of at least about 500,000, and for best results several million such as 3, 4, or 5 million or higher. Treatment of an acidic aqueous solution with a dilute solution of the preferred species of polymer results in the formation of a rubbery precipitate which binds substantially all of the polycondensed silica which is detrimental to hydrometallurgical processes, provided sufficient reagent is added. However, the silica content is reduced even when very small amounts are added. Excessive amounts of reagent are not deleterious to subsequent processing, but for practical purposes it is preferred to use only a sufficient amount to react with the polycondensed silica, bind it and form a precipitate therewith. My earlier experiments have shown that the higher the molecular weight of the solubilized silica the smaller the quantity of the above mentioned water soluble poly(ethylene oxide) polymer which need be added to precipitate a given quantity of polysilicic acid. Optimum levels of dosage on a weight basis are from about 1 part of poly(ethylene oxide) to 30 parts of precipitable condensed polysilicic acid to about 1 part of poly(ethylene oxide) polymer to about 5 parts of precipitable condensed polysilicic acid as determined by, for example, the Triton test. Better results may be obtained in some instances by employing about 1 part of the polymer to about 10–20 parts of polycondensed silicic acid. A leach liquor or an acidic aqueous solution treated to the point of preventing further precipitation on addition of still further amounts of the polymers will not perform deleteriously in solvent extraction processes. The pH at which the aqueous medium is treated is preferably below about 4.5, and for best results about 1.0 to 2.5. The precipitate and its contained silica content may be separated from the solution by filtration or other method if desired.

In accordance with the present invention, I have discovered a selective adsorption phenomenon for solubilized silica which is exhibited by water insoluble organic materials containing a poly(alkylene oxide) structure and, preferably, a poly(ethylene oxide) structure. An acidic aqueous medium containing solubilized polycondensed silica as described herein, the presence of which may be ascertained through the Triton test or through the use of egg albumen as a precipitant, may be reduced in solubilized silica content by intimately contacting it with the water insoluble organic material containing a poly(alkylene oxide) structure to thereby adsorb the solubilized silica.

The water insoluble organic materials for use in adsorbing solubilized silica in accordance with the invention may contain the divalent structure or grouping (—O—R—)$_n$, where R is an alkylene radical containing, for example 2 through 8 and preferably 2 through 4 carbon atoms and $n$ is an integer of at least 2. The terminal valences for the divalent structure (—O—R—)$_n$, may vary widely and are not of importance provided the resultant compound is water insoluble. For instance, the terminal valences may be satisfied by monovalent groups such as H, OH, alkyl, aryl, aralkyl, cycloalkyl, etc. Specific examples of water insoluble materials for use in adsorbing solubilized silica include hydroxybenzene-aldehyde resins, polyester resins and alkyd resins which contain the divalent radical (—O—R—)$_n$.

The hydroxybenzene-aldehyde resins may be prepared by any convenient method. For example, phenol may be polyoxyethylated and then condensed with formaldehyde, or a phenol-formaldehyde polymer may be condensed with ethylene oxide to produce the water-insoluble matrix which is necessary.

Polyester resins and alkyl resins may be prepared by reacting polybasic acids and/or their anhydrides which are ethylenically unsaturated or free of ethylenic unsaturation, respectively, with polyalkylene glycols containing, for example, 2–8 and preferably more alkylene oxide residues per molecule. Specific examples of polybasic acids or anhydrides for use in preparing polyesters include maleic acid, maleic anhydride and similar ethylenically unsaturated polybasic acids and anhydrides. Examples of polybasic acids and anhydrides for use in preparing alkyl resins include succinic acid, succinic anhydride, phthalic acid, phthalic anhydride and similar polybasic acids and acid anhydrides which are free of ethylenic unsaturation. Specific examples of polyalkylene oxide glycols include ethylene oxide glycols, propylene oxide glycols and butylene oxide glycols containing at least 2 and preferably 2–8 alkylene oxide residues per molecule.

Cross-linked, water insoluble poly(alkylene oxide) materials also are very effective. In preparing these materials, an alkylene oxide such as ethylene or propylene oxide may be polymerized in the presence of a small amount of a diepoxide or polyepoxide such as 1,2,3,4-diepoxy butane by processes well known to the art. For example, the polymerization may take place in aqueous solution in the presence of a small amount of an alkaline earth metal catalyst. Additionally, the product of the esterification of a highly porous polycarboxylic acid cation exchange resin with a polyalkylene glycol is very satisfactory and may be used.

The water insoluble organic material containing the poly(alkylene oxide) structure is intimately contacted with the aqueous medium containing solubilized silica under acidic conditions for any suitable period of time sufficient to absorb the silica. Preferably, the pH of the aqueous medium is not greater than 4.5 and for best results between about 1 and 2.5, and sufficient material is contacted with the aqueous medium to at least substantially reduce the solubilized silica content precipitable with egg albumen. The silica-loaded organic material may be separated from the aqueous medium, if desired, and regenerated to desorb the silica by treatment with dilute base such as aqueous sodium or potassium hydroxide, ammonium hydroxide, etc. The regenerated material may be separated from the base and used to adsorb additional silica, if desired.

The present invention is especially useful in hydrometallurgical processes for the recovery by solvent extraction of desired dissolved metal valves from silica-containing aqeous media. The aqueous media are first treated as described above to reduce the solubilized silica content, and then the desired dissolved metal values are recovered by solvent extraction following prior art practices. The difficulties due to solubilized silica may be reduced and even completely eliminated in many instances by following this practice.

The foregoing detailed description and the following specific examples are for purposes of illustration only, and are not intended as being limiting to the spirit or scope of the appended claims.

Example I

A uranium ore is leached with sulfuric acid and an oxidizing agent in the conventional manner to produce a uranium-containing acidic leach liquor having a pH of about 1.2 and containing approximately 1 gram per liter $U_3O_8$ in the form of the sulfate and also containing small amounts of iron, aluminum, magnesium, and vanadium in solution. This particular ore contained a siliceous material which partially dissolves during the leach so that the clarified leach liquor contains in solution or as a colloidal dispersion 3 grams per liter of silica expressed as $SiO_2$. This is the total silica content and includes both the partly condensed colloidal to sub-colloidal silica as well as unimolecular and low molecular weight silicic acids.

The above prepared leach liquor gives a positive Triton test and a precipitate with egg albumen.

The above leach liquor could not be processed by contacting it with a kerosene solution of a prior art organic solvent extractant for uranium without the appearance of an emulsified phase and phase separation was slow and incomplete.

Example II

Equal molar quantities of maleic anhydride and triethylene glycol were mixed and heated to 210–220° C. with stirring for about 30 minutes. The temperature was raised to 270–280° C. for 5 minutes until the mixture had resinified and set almost solid. The mixture was then cooled, the soft resin broken into particles, and the particles washed in water, dilute ammonia and dilute acid.

Percolation of the leach liquor of Example 1 through a column charged with the above prepared resin produces an effluent which contains only 0.4 gram per liter of silica. The effluent gives a negative Triton test and no precipitate with egg albumen, thereby indicating that it is free of polycondensed silica.

The treated leach liquor now could be processed by contacting it with a kerosene solution of a prior art organic solvent extractant for uranium to thereby recover the uranium without the appearance of an emulsified phase and phase separation was rapid and complete.

What is claimed is:

1. A process for reducing the solubilized silica content of an acidic aqueous medium comprising
   intimately contacting the aqueous medium with a solid water insoluble organic compound containing a poly(alkylene oxide) structure to adsorb solubilized silica,
   the aqueous medium containing solubilized silica which is precipitable with egg albumen and the organic compound being an adsorbent for the precipitable solubilized silica.

2. The process of claim 1 wherein the aqueous medium has a pH not greater than 4.5.

3. The process of claim 1 wherein the organic compound is selcted from the group consisting of hydroxybenzene-aldehyde resins, polyester resins, alkyd resins and cross-linked copolymers of alkylene oxides and poly-epoxides.

4. The process of claim 1 wherein the aqueous medium has a pH not greater than 4.5 and the organic compound is selected from the group consisting of hydroxybenzene-aldehyde resins, polyester resins, alkyd resins and cross-linked copolymers of alkylene oxides and polyepoxides.

5. The process of claim 1 wherein the resultant organic compound containing adsorbed silica is regenerated by intimately contacting it with an aqueous alkaline solution to remove adsorbed silica.

6. The process of claim 1 wherein the organic compound has a poly(ethylene oxide) structure.

7. The process of claim 1 wherein the organic compound has a poly(ethylene oxide) structure and the aqueous medium has a pH not greater than 4.5.

8. The process of claim 1 wherein the organic compound has a poly(ethylene oxide) structure and is selected from the group consisting of hydroxybenzene-aldehyde resins, polyester resins, alkyd resins and cross-linked copolymers of alkylene oxides and polyepoxides.

9. The process of claim 1 wherein the aqueous medium has a pH not greater than 4.5 and the organic compound has a poly(ethylene oxide) structure and is selected from the group consisting of hydroxybenzene-aldehyde resins, polyester resins, alkyd resins and cross-linked copolymers of alkylene oxides and polyepoxides.

10. The process of claim 1 wherein the organic compound has a poly(ethylene oxide) structure, and the resultant organic compound containing adsorbed silica is regenerated by intimately contacting it with an aqueous alkaline solution to remove adsorbed silica.

11. In a hydrometallurgical process for the recovery of metal values from a aqueous medium containing solubilized silica wherein the solubilized silica interferes with the recovery of the metal values, the improvement comprising
    reducing the solubilized silica content of the aqueous medium by intimately contacting it with a water insoluble organic compound containing a poly(alkylene oxide) structure to adsorb solubilized silica,
    the aqueous medium containing solubilized silica which is precipitable by egg albumen and the organic compound being an adsorbent for the precipitable solubilized silica,
    and thereafter recovering the metal values.

12. The process of claim 11 wherein the pH of the aqueous medium is not greater than 4.5 and the organic compound has a poly(ethylene oxide) structure and is selected from the group consisting of hydroxybenzene-aldehyde resins, polyester resins, alkyd resins and cross-linked copolymers of alkylene oxides and polyepoxides.

13. In a process for the recovery of metal values from an aqueous medium containing solubilized silica by extraction with a water immiscible liquid organic extractant, the organic extractant and aqueous medium being intermixed and the solubilized silica retarding separation of the organic extractant and aqueous phases, the improvement comprising reducing the solubilized silica content by intimately contacting the aqueous medium with a water insoluble organic compound containing a poly(alkylene oxide) structure to adsorb solubilized silica, the aqueous medium containing solubilized silica which is precipitable with egg albumen and the organic compound being an adsorbent for the precipitable solubilized silica, and thereafter recovering the metal values.

14. The process of claim 13 wherein the aqueous medium has a pH not greater than 4.5.

15. The process of claim 13 wherein the organic compound has a poly(ethylene oxide) structure.

16. The process of claim 13 wherein the aqueous medium has a pH not greater than 4.5 and the organic compound has a poly(ethylene oxide) structure.

17. The process of claim 13 wherein the aqueous medium has a pH not greater than 4.5 and the organic compound has a poly(ethylene oxide) structure and is selected from the group consisting of hydroxybenzene-aldehyde resins, polyester resins, alkyd resins, and cross-linked copolymers of alkylene oxides and polyepoxides.

18. A process for reducing the solubilized silica content of an acidic aqueous medium comprising intimately contacting the aqueous medium with a water insoluble poly(ethylene oxide) to absorb solubilized silica, the aqueous medium containing solubilized silica which is precipitable with egg albumen and the water insoluble poly(ethylene oxide) being an adsorbent for the precipitable solubilized silica.

19. The process of claim 18 wherein the aqueous medium has a pH not greater than 4.5.

20. In a hydrometallurgical process for the recovery of metal values from an aqueous medium containing solubilized silica wherein the solubilized silica interferes with the recovery of the metal values, the improvement comprising reducing the solubilized silica content of the aqueous medium by contacting it with a water insoluble poly(ethylene oxide) to adsorb solubilized silica, the aqueous medium containing solubilized silica which is precipitable with egg albumen and the organic compound being an adsorbent for the precipitable solubilized silica, and thereafter recovering the metal values.

21. The process of claim 20 wherein the aqueous medium has a pH not greater than 4.5.

22. In a process for the recovery of metal values from an aqueous medium containing solubilized silica by extraction with a water immiscible liquid organic extractant, the organic extractant and aqueous medium being intermixed and the solubilized silica retarding separation of the organic extractant and aqueous phases, the improvement comprising reducing the solubilized silica content by intimately contacting the aqueous medium with a water insoluble poly(ethylene oxide) to adsorb solubilized silica, the aqueous medium containing solubilized silica which is precipitable with egg albumen and the organic compound being an adsorbent for the precipitable solubilized silica, and thereafter recovering the metal values.

23. The process of claim 22 wherein the aqueous medium has a pH not greater than 4.5.

References Cited by the Examiner

UNITED STATES PATENTS

| 1,908,994 | 5/1933 | Meyer | 75—97 |
| 2,386,337 | 10/1945 | Moyer | 23—182 |
| 2,860,956 | 11/1958 | Arden | 23—309 |
| 2,917,469 | 12/1959 | Phillips | 260—2 |
| 2,940,951 | 6/1960 | Ruskin | 260—37 |
| 2,962,453 | 11/1960 | Phillips | 260—2 |
| 3,007,888 | 11/1961 | Mack | 260—37 |
| 3,055,754 | 9/1962 | Fletcher | 75—97 |

OTHER REFERENCES

De, Separation of Heavy Metals, Pergamon Press, N.Y., 1961, pp. 32–34 and 184–187.

DAVID L. RECK, *Primary Examiner.*

H. W. CUMMINGS, N. F. MARKVA,
*Assistant Examiners.*